(12) United States Patent
Briesch et al.

(10) Patent No.: US 10,280,809 B2
(45) Date of Patent: May 7, 2019

(54) METHODS FOR OPERATING A COMBINED CYCLE POWER PLANT AND IMPROVING PART LOAD EFFICIENCY

(71) Applicant: Siemens Energy, Inc., Orlando, FL (US)

(72) Inventors: Michael S. Briesch, Orlando, FL (US); Ankur Deshmukh, Oviedo, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 22 days.

(21) Appl. No.: 15/551,942

(22) PCT Filed: Feb. 2, 2016

(86) PCT No.: PCT/US2016/016068
§ 371 (c)(1),
(2) Date: Aug. 18, 2017

(87) PCT Pub. No.: WO2016/137677
PCT Pub. Date: Sep. 1, 2016

(65) Prior Publication Data
US 2018/0030859 A1     Feb. 1, 2018

Related U.S. Application Data

(63) Continuation of application No. PCT/US2016/014675, filed on Jan. 25, 2016.
(Continued)

(51) Int. Cl.
*F01K 23/10*     (2006.01)
*F01K 7/22*      (2006.01)
(Continued)

(52) U.S. Cl.
CPC ............... *F01K 23/106* (2013.01); *F01K 3/26* (2013.01); *F01K 7/18* (2013.01); *F01K 7/22* (2013.01);
(Continued)

(58) Field of Classification Search
CPC ........ F01K 23/106; F01K 23/101; F01K 7/32; F01K 7/22; F01K 7/18; F01K 3/26; F01K 23/10; Y02E 20/16
(Continued)

(56) References Cited

U.S. PATENT DOCUMENTS 4,896,498 A * 1/1990 Knizia ................. F01K 23/067
                                                          60/39.12
5,887,418 A * 3/1999 Bruckner .............. F01K 23/103
                                                          60/39.182

(Continued)

OTHER PUBLICATIONS

Alobaid F et al: "Dynamic simulation of a supercritical once-through heat recovery steam generator during load changes and start-up procedures", Applied Energy, Elsevier Science Publishers, GB, vol. 86, No. 7-8, Jul. 1, 2009, pp. 1274-1282.

(Continued)

*Primary Examiner* — Hoang M Nguyen

(57) ABSTRACT

A method for operating a combined cycle power plant (CCPP) and improving a part load operation of the CCPP is provided. The CCPP may include at least a gas turbine, a heat recovery steam generator (HRSG) located downstream of the gas turbine, a main steam turbine, and a supercritical steam turbine. The HRSG may include a low pressure steam system, an intermediate pressure steam system, and a high pressure steam system. To improve the part load efficiency of the CCPP, a base load operation of the CCPP may be initiated with supercritical pressure, via the supercritical steam turbine, such that the efficiency impact resulting from the part load operation is reduced.

12 Claims, 10 Drawing Sheets

Related U.S. Application Data

(60) Provisional application No. 62/119,886, filed on Feb. 24, 2015.

(51) Int. Cl.
  *F01K 7/32* (2006.01)
  *F01K 7/18* (2006.01)
  *F01K 3/26* (2006.01)

(52) U.S. Cl.
  CPC ............... *F01K 7/32* (2013.01); *F01K 23/10* (2013.01); *F01K 23/101* (2013.01); *Y02E 20/16* (2013.01)

(58) Field of Classification Search
  USPC ...................................................... 60/39.182
  See application file for complete search history.

(56) References Cited

U.S. PATENT DOCUMENTS

| | | | | |
|---|---|---|---|---|
| 6,230,480 | B1* | 5/2001 | Rollins, III | F01K 23/105 |
| | | | | 122/7 B |
| 2001/0008067 | A1* | 7/2001 | Liebig | F01K 23/106 |
| | | | | 60/772 |
| 2004/0045299 | A1* | 3/2004 | Blatter | F01D 19/00 |
| | | | | 60/772 |
| 2009/0090111 | A1 | 4/2009 | Tomlinson et al. | |

OTHER PUBLICATIONS

Vivek Asthana et al: "Performance of Power Plants With High Temperature Conditions at Sub-Critical Pressures", Jan. 1, 2008, 5th European Thermal-Sciences Conference, The Netherlands, pp. 1-8.

PCT International Search Report and Written Opinion of International Searching Authority dated Apr. 25, 2016 corresponding to PCT International Application No. PCT/US2016/016068 filed Feb. 2, 2016.

\* cited by examiner

METHODS FOR OPERATING A COMBINED CYCLE POWER PLANT AND IMPROVING PART LOAD EFFICIENCY

CROSS REFERENCE

This application claims the benefit of International Application Serial No.: PCT/US2016/014675 filed on Jan. 25, 2016, which claims the benefit of and priority to U.S. provisional application 62/119,886 filed on Feb. 24, 2015, the disclosures of which are hereby incorporated by reference herein.

TECHNICAL FIELD

Aspects of the present invention relate to a combined cycle power plant, and particularly to, methods for operating a combined cycle power plant having a supercritical steam turbine, and more particularly to methods for improving the efficiency of the combined cycle power plant with supercritical steam turbine.

BACKGROUND

A combined cycle power plant may include a gas turbine that generates power output from combustion of a fuel and air mixture. A heat recovery steam generator may be located downstream from the gas turbines to receive exhaust gas from the gas turbines. The heat recovery steam generator extracts energy from the exhaust gas to produce superheated steam. The superheated steam may be transferred to a steam turbine for generating additional power output. A steam turbine may include multiple pressure steam sections such as a high pressure steam section, an intermediate pressure steam section, and one or more low pressure steam section. The combined cycle power plant may be in a single-shaft application. A single-shaft application may include one generator that is connected to the gas turbine and the steam turbine. The combined cycle power plant may be in a multiple-shaft application. A multiple-shaft application may include multiple generators. Each of the multiple generators may be connected to the gas turbine and the steam turbine separately.

It is often desired and required to operate the combined cycle power plant at a load below the maximum rating of the plant. This scenario is termed as part load operation. It is also known that the thermal efficiency of combined cycle Bratyon Cycle and Rankine Cycle engines is significantly reduced when operating at part loads. For example, a steam turbine in the Rankine cycle being a constant volume system would operate at reduced throttle pressure when operating at lower loads, i.e., a lower steam flow. Consequently, this operation may reduce the theoretical maximum reversible operation for steam expansion and will reduce the power output. Therefore, a need remains to improve performance of a combined cycle power plant at lower loads.

SUMMARY

Briefly described, aspects of the present invention relate to a combined cycle power plant and method for operating a combined cycle power plant, and in particular a combined cycle power plant comprising a supercritical steam turbine. To improve performance of a combined cycle power plant (CCPP) at lower loads, it would be desirable to increase the base load steam pressure to supercritical steam parameters. This would enable the part load operation at higher subcritical pressures and result in lower part load penalties. A steam having parameters above the critical parameters of water is referred as a supercritical steam. That is, a steam having a pressure which is above a critical pressure of water and having a temperature which is above a critical temperature of water. The critical pressure of water is about 3206.2 psi. The critical temperature of water is about 705.4 F.

According to an aspect, a method for operating a combined cycle power plant is presented. The combined cycle power plant may include a gas turbine, a heat recovery steam generator located downstream of the gas turbine, a main steam turbine, and a supercritical steam turbine. The heat recovery steam generator may include multiple pressure steam systems with a low pressure steam system, an intermediate pressure steam system, and a high pressure steam system. The method includes the step of operating the gas turbine to generate power output. The method also includes the step of generating low pressure steam in the low pressure steam system by extracting energy from exhaust gas of the gas turbine; generating intermediate pressure steam in the intermediate pressure steam system by extracting energy from the exhaust gas of the gas turbine; and generating supercritical steam in the high pressure steam system by extracting energy from the exhaust gas of the gas turbine. The method further includes the step of transferring the supercritical steam to the supercritical steam turbine, and operating the supercritical steam turbine to generate power output by expanding the supercritical steam and producing exiting steam. The method also comprises operating the main steam turbine to generate power output from the exiting steam from the supercritical steam turbine, the intermediate pressure steam generated in the heat recovery steam generator, and the low pressure steam generated in the heat recovery steam generator.

In yet a further aspect, a method for improving the efficiency impact of a part load operation of a combined cycle power plant is presented. In this embodiment, the method comprises the step of initiating a base load operation of the combined cycle power plant at a supercritical steam level, or more particularly, a supercritical pressure level.

Various aspects and embodiments of the application as described above and hereinafter may not only be used in the combinations explicitly described, but also in other combinations. Modifications will occur to the skilled person upon reading and understanding of the description.

BRIEF DESCRIPTION OF THE DRAWINGS

Exemplary embodiments of the application are explained in further detail with respect to the accompanying drawings. In the drawings.

To facilitate understanding, identical reference numerals have been used, where possible, to designate identical elements that are common to the figures.

DETAILED DESCRIPTION OF INVENTION

A detailed description related to aspects of the present invention is described hereafter with respect to the accompanying figures.

Figure 1:
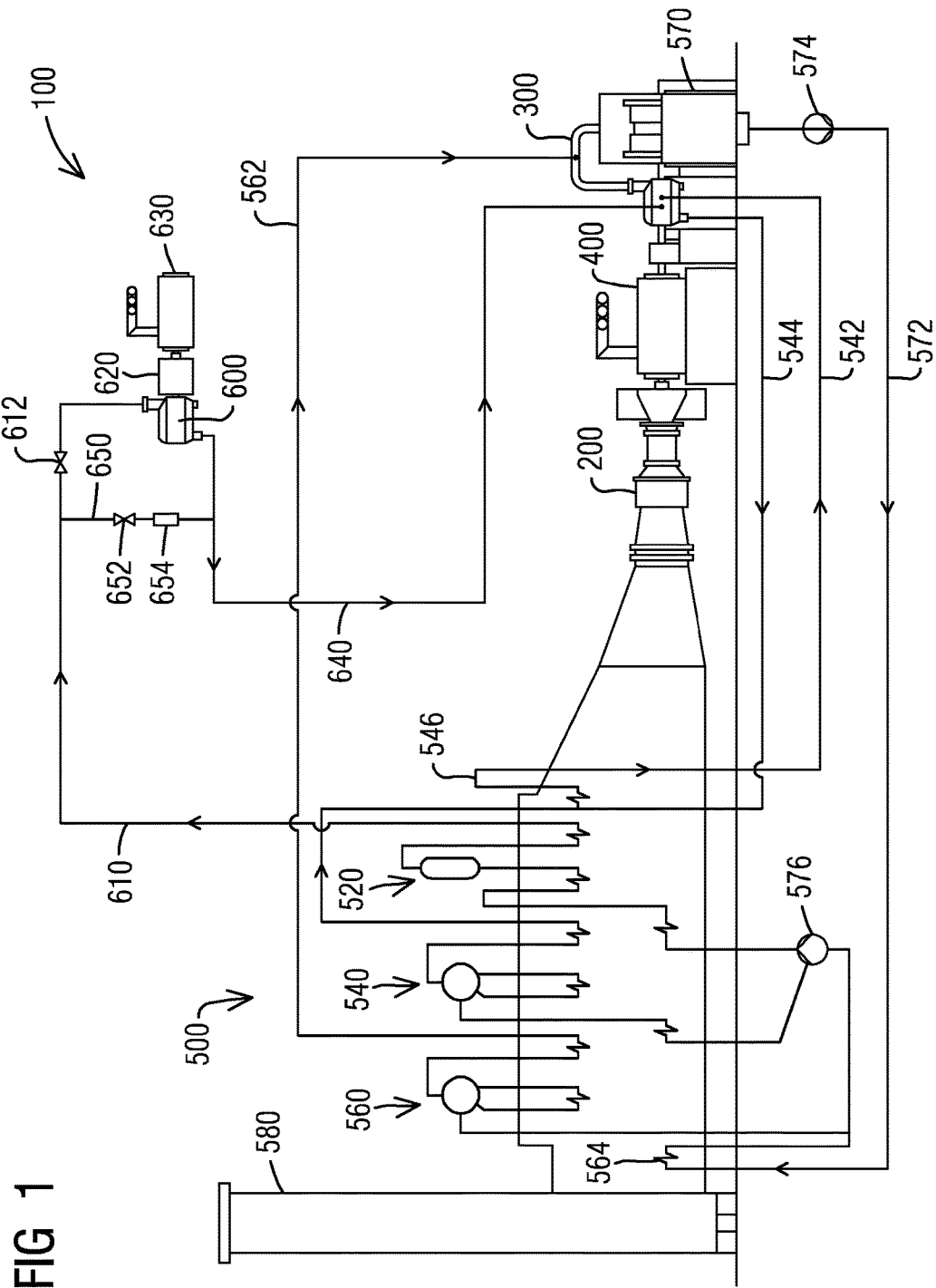
FIG. 1 illustrates a schematic flow diagram of a combined cycle power plant having a supercritical steam turbine according to an embodiment wherein a supercritical steam turbine is connected to a supercritical steam turbine generator.

FIG. 1 illustrates a schematic flow diagram of a combined cycle power plant 100 having a supercritical steam turbine (SST) 600 according to an embodiment. In the example illustrated embodiment, the combined cycle power plant 100 comprises a gas turbine 200. The gas turbine 200 may generate power output from combustion of a fuel and air mixture. The power plant 100 comprises a heat recovery steam generator (HRSG) 500 located downstream of the gas turbine 200. Exhaust gas from the gas turbine 200 may flow through the HRSG 500 to produce steam. The exhaust gas may exit the HRSG 500 through an exhaust stack 580. According to the example illustrated embodiment, the power plant 100 comprises a main steam turbine 300. The main steam turbine 300 may receive steam generated in the HRSG 500 to produce power output.

A combined cycle power plant (CCPP) 100 may be in a single shaft configuration, or in a multi-shaft configuration. The CCPP 100 illustrated in FIG. 1 is in a single shaft configuration, where the gas turbine 200 and the main steam turbine 300 are connected to a common generator 400. In a multi-shaft configuration, a gas turbine 200 and a main steam turbine 300 may be connected to separate generators.

According to an embodiment, a HRSG 500 may comprise multiple pressure steam systems. In the example embodiment illustrated in FIG. 1, the HRSG 500 comprises three pressure steam systems including a high pressure (HP) steam system 520, an intermediate pressure (IP) steam system 540, and a low pressure (LP) steam system 560. According to an embodiment, a main steam turbine 300 may include multiple pressure steam turbine sections, for example, a LP steam turbine section, an IP steam turbine section, and a HP steam turbine section. In the illustrated embodiment of FIG. 1, a LP steam turbine section of the main steam turbine 300 may receive LP steam generated in the HRSG 500 via a LP steam line 562. Exhaust from the LP steam turbine section of the main steam turbine 300 may enter into a condenser 570. Condensate may be fed from the condenser 570 to the HRSG 500 via a condensate line 572 with an aid of a condensate extraction pump 574. The condensate may pass through LP steam system 560 to generate LP steam. The LP steam may be fed back to the LP steam turbine section of the main steam turbine 300 via the LP steam line 562. The LP steam system 560 comprises a condensate preheater 564. The condensate after passing through the condensate preheater 564 may be fed to the HP steam system 520 and the IP steam system 540 with an aid of a boiler feed pump 576. The IP steam system 540 may generate IP steam. Exhaust of the HP steam turbine section of the main steam turbine 300 may be fed back to a reheater 546 via a cold reheat line 544. The reheated steam may be mixed with the IP steam generated in the IP steam system 540 and transferred to the main steam turbine 300 via an IP steam line 542.

According to an embodiment illustrated in FIG. 1, the CCPP 100 may include a SST 600. According to the embodiment, the HP steam system 520 of the HRSG 500 may generate supercritical steam. A supercritical steam may have a steam pressure that is above a critical pressure of water. The critical pressure of water is about 3206.2 psi. A supercritical steam may have a steam temperature that is above a critical temperature of water. The critical temperature of water is about 705.4 F. The supercritical steam generated in the HRSG 500 may be fed to the SST 600 via a supercritical steam line 610. The supercritical steam line comprises a supercritical steam flow control valve 612. The supercritical steam flow control valve 612 may control a flow of the supercritical steam to the SST 600. The supercritical steam may be expanded in the SST 600 and exit from the SST 600 as an exiting steam. Steam parameters of the exiting steam from the SST 600 may be reduced below critical parameters. A pressure of the exiting steam from the SST 600 may be suitable to a HP steam turbine section of the main steam turbine 300. The exiting steam may be fed to the HP steam turbine section of the main steam turbine 300 via an exiting line 640. According to an embodiment, the main steam turbine 300 may generate power output from the exiting steam from the SST 600, the IP steam generated in the HRSG 500, and the LP steam generated in the HRSG 500.

According to an embodiment illustrated in FIG. 1, the power plant 100 comprises a supercritical steam bypass line 650. The supercritical steam generated in the HRSG 500 may be bypassed through the supercritical steam bypass line 650 during the power plant 100 startup or when the SST 600 is unavailable. A supercritical steam bypass valve 652 may be arranged in the supercritical steam bypass line 650. During a supercritical steam bypass process, the supercritical steam flow control valve 612 may be closed to prevent the supercritical steam flowing into the SST 600. The supercritical steam bypass valve 652 is open to allow the supercritical steam bypassing through the supercritical steam bypass line 650. The supercritical steam bypass valve 652 may expand the supercritical steam. A pressure of the expanded steam may be suitable to a HP steam turbine section of the main steam turbine 300. According to an embodiment, a water injection device 654 may be arranged in the supercritical steam bypass line 650 downstream of the supercritical steam bypass valve 652. The water injection device 654 may inject water to the expanded steam to reduce a temperature of the expanded steam below a critical temperature of water. Exiting steam after passing through the supercritical steam bypass line 650 may be transferred to a HP steam turbine section of the main steam turbine 300 via the exiting line 640.

According to an embodiment illustrated in FIG. 1, the SST 600 may be arranged as a separate steam turbine that may be not a single steam turboset with the main steam turbine 300. The illustrated embodiment may allow the SST 600 to be operated at a rotational speed that equals to a grid frequency, or at a rotational speed that does not equal to a grid frequency. The SST 600 may be operated at a rotational speed that is higher than a grid frequency. According to an embodiment, the SST 600 may be operated at a rotational speed that is much higher than a grid frequency. For example, the SST 600 may be operated at a rotational speed that is at least 1.5 times higher than a grid frequency, or at least twice higher than a grid frequency, or at least three times higher than a grid frequency, or a rotational speed that may optimize power plant efficiency improvement with supercritical steam parameters. According to an embodiment, the SST 600 may be designed with a small shaft diameter due to a high rotational speed. Small shaft diameter may reduce shaft leakage area. Small shaft diameter may increase blade length of the SST 600. Increased turbine blade length may increase efficiency of the SST 600.

According to an embodiment illustrated in FIG. 1, the SST 600 may be connected to a gearbox 620. The gearbox 620 may reduce a rotational speed of the SST 600 that is higher than a grid frequency to the grid frequency. According to the example embodiment illustrated in FIG. 1, the combined cycle power plant may include a supercritical steam turbine generator 630. The SST 600 may be connected to the supercritical steam turbine generator 630 via the gearbox 620 to generate power output after reducing the rotational speed to the grid frequency. According to an embodiment, the supercritical steam turbine generator 630 may be arranged at a location for easy installation. According to an embodiment, the SST 600 may be arranged at a location that is close to a HRSG 500 to reduce high energy piping length.

Figure 2:
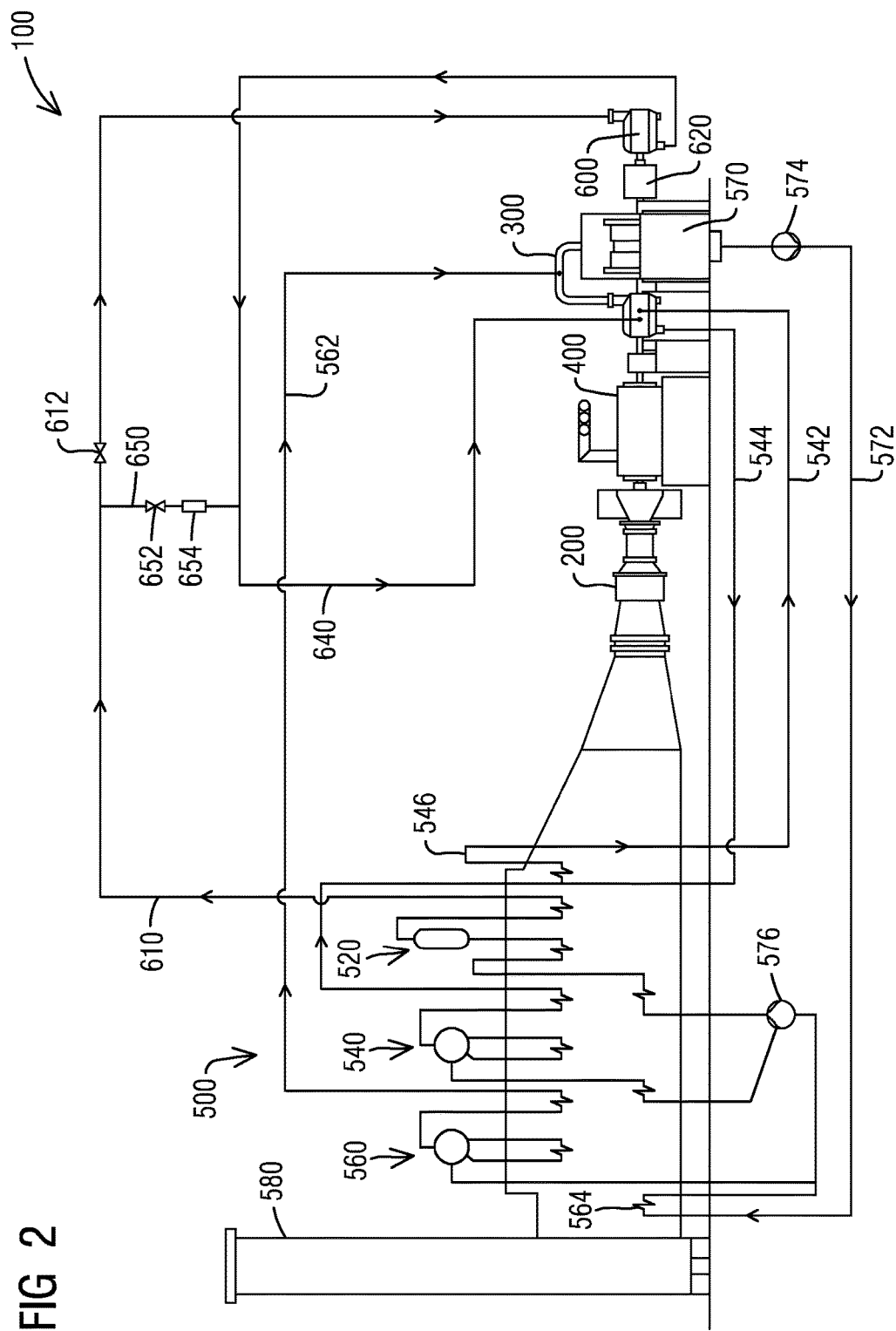
FIG. 2 illustrates a schematic flow diagram of a combined cycle power plant having a supercritical steam turbine according to an embodiment wherein a supercritical steam turbine is connected to a main steam turbine.

FIG. 2 illustrates a schematic diagram of a CCPP 100 having a SST 600 according to an embodiment. In this embodiment, the SST 600 may be operated at a rotational speed that is higher than a grid frequency. A gearbox 620 may be connected to the SST 600. The gearbox 620 may reduce the rotational speed of the SST 600 to the grid frequency. According to the example embodiment as illustrated in FIG. 2, the SST 600 may be connected to a main steam turbine 300 via the gearbox 620 after reducing the rotational speed to the grid frequency. According to the example embodiment as illustrated in FIG. 2, the SST 600 may not require a separate generator. The embodiment of FIG. 2 otherwise corresponds to the embodiment of FIG. 1. Corresponding parts of FIG. 2 are correspondingly numbered, but are not described again with reference to FIG. 2.

Figure 3:
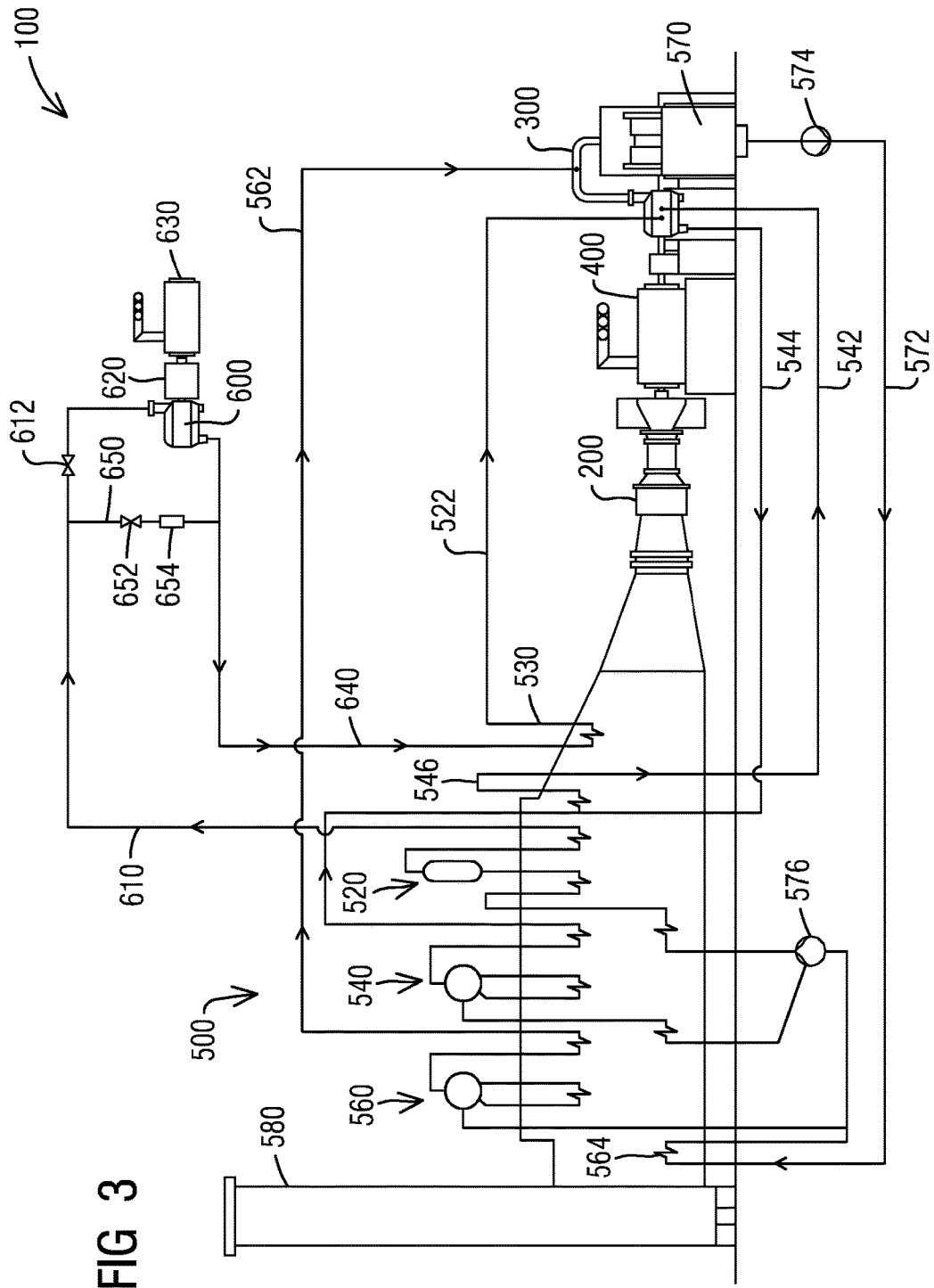
FIG. 3 illustrates a schematic flow diagram of a combined cycle power plant having a supercritical steam turbine according to an embodiment wherein exiting steam of a supercritical steam turbine is reheated in a HRSG prior to be transferred to a main steam turbine.

FIG. 3 illustrates a schematic diagram of a CCPP 100 having a SST 600 according to an embodiment. In this embodiment, a HRSG 500 may include an additional reheater 530. Exiting steam from the SST 600 may be routed to the additional reheater 530 via an exiting line 640. According to the embodiment, the exiting steam of the SST 600 may be reheated in the additional reheater 530 to increase temperature of the exiting steam. The reheated exiting steam of the SST 600 may be transferred to a main steam turbine 300 via a HP steam line 522. The illustrated example embodiment of FIG. 3 may increase efficiency of the main steam turbine 300. The embodiment of FIG. 3 otherwise corresponds to the embodiment of FIG. 1. Corresponding parts of FIG. 3 are correspondingly numbered, but are not described again with reference to FIG. 3.

Figure 4:
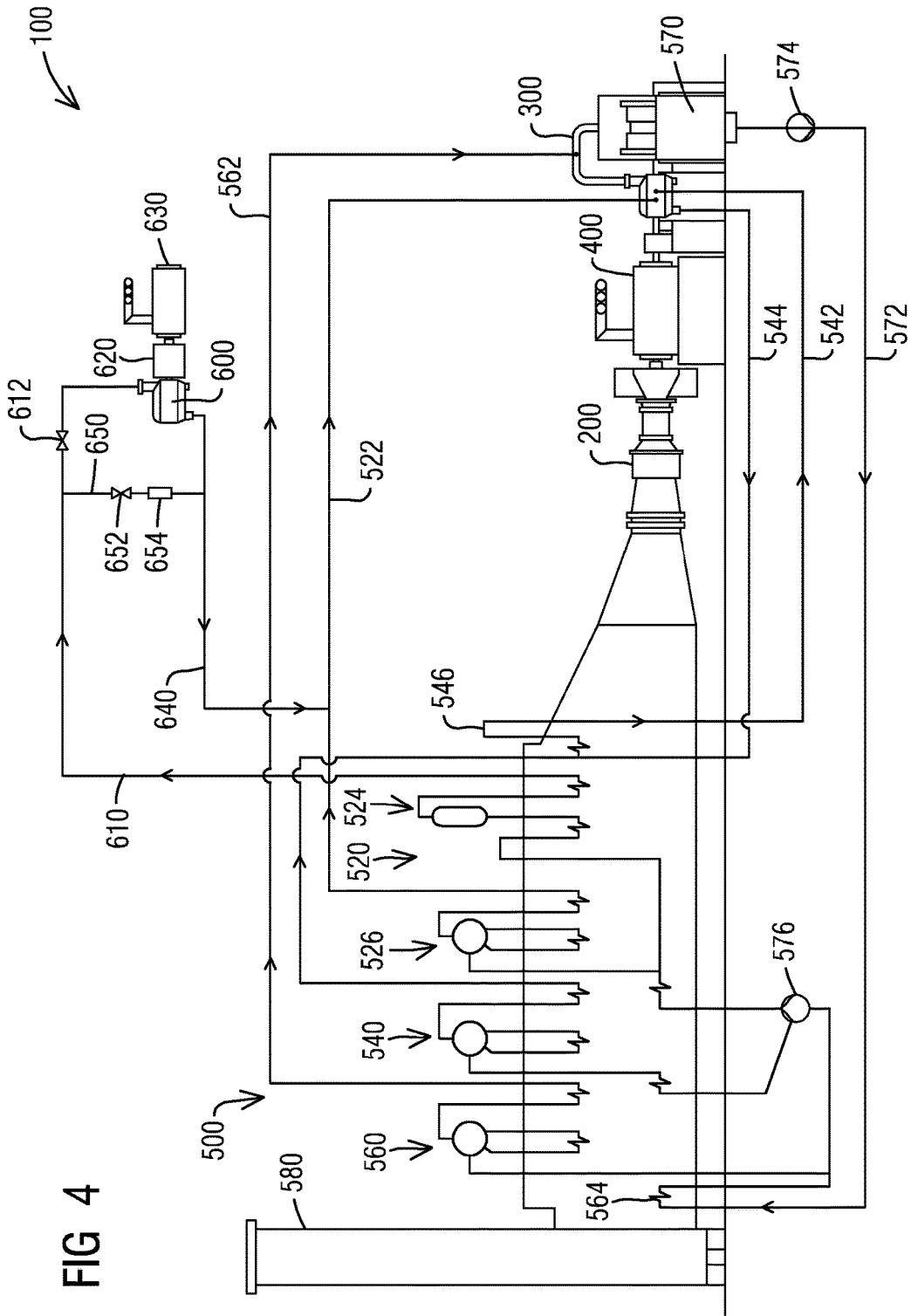
FIG. 4 illustrates a schematic flow diagram of a combined cycle power plant having a supercritical steam turbine according to an embodiment wherein exiting steam of a supercritical steam turbine is mixed with subcritical HP steam generated in a HRSG and the HP steam mixture is transferred to a main steam turbine.

FIG. 4 illustrates a schematic flow diagram of a CCPP 100 having a SST 600 according to an alternative embodiment. In this embodiment, a HP steam system 520 of a HRSG 500 comprises a supercritical HP steam system 524 that may generate supercritical steam. The HP steam system 520 further comprises a subcritical HP steam system 526 that may generate subcritical HP steam. The supercritical steam may be fed to a SST 600 via a supercritical steam line 610. According to the illustrated example embodiment, exiting steam from the SST 600 may be mixed with the subcritical HP steam via an exiting line 640 to generate a HP steam mixture. The HP steam mixture may be fed to the main steam turbine 300 via a HP steam line 522. The embodiment of FIG. 4 otherwise corresponds to the embodiment of FIG. 1. Corresponding parts of FIG. 4 are correspondingly numbered, but are not described again with reference to FIG. 4.

Figure 5:
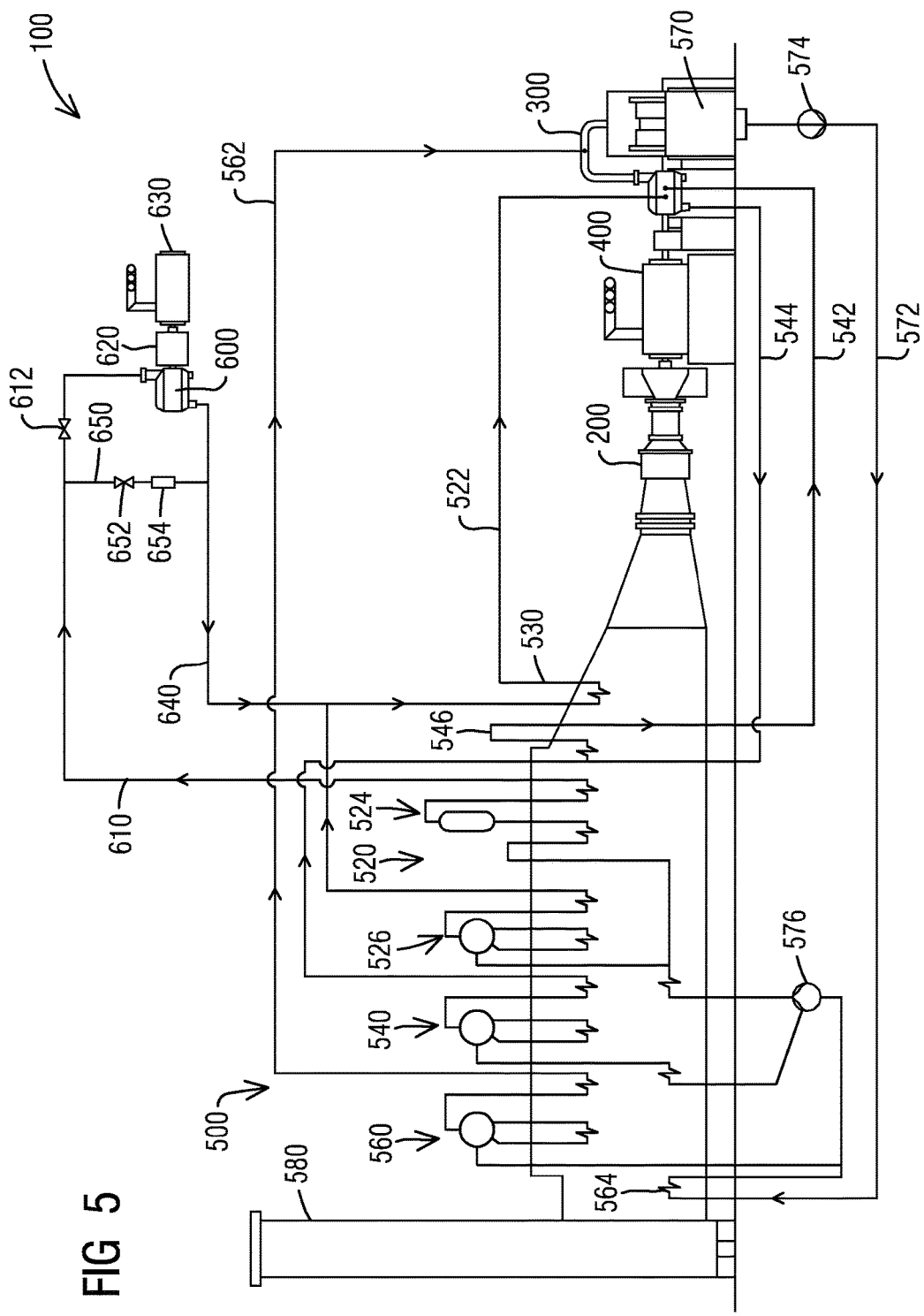
FIG. 5 illustrates a schematic flow diagram of a combined cycle power plant having a supercritical steam turbine according to an embodiment wherein exiting steam of a supercritical steam turbine is mixed with subcritical HP steam generated in a HRSG and the HP steam mixture is reheated prior to be transferred to a main steam turbine.

FIG. 5 illustrates a schematic flow diagram of a CCPP 100 having a SST 600 according to an embodiment. In this embodiment, a HRSG 500 may include an additional reheater 530. According to the illustrated example embodiment, a HP steam system 520 of a HRSG 500 comprises a supercritical HP steam system 524 that may generate supercritical steam. The HP steam system 520 further comprises a subcritical HP steam system 526 that may generate subcritical HP steam. The supercritical steam generated by the supercritical HP steam system 524 may be fed to a SST 600 via a supercritical steam line 610. According to the illustrated example embodiment, exiting steam from the SST 600 may be mixed with the subcritical HP steam via an exiting line 640 to generate a HP steam mixture. The HP steam mixture may be reheated in the additional reheater 530 to increase temperature of the HP steam mixture. The reheated HP steam mixture may be transferred to a main steam turbine 300 via a HP steam line 522. The embodiment of FIG. 5 otherwise corresponds to the embodiment of FIG. 4. Corresponding parts of FIG. 5 are correspondingly numbered, but are not described again with reference to FIG. 5.

A CCPP 100 may be in a single shaft configuration, or in a multi-shaft configuration. The illustrated example embodiments of a CCPP 100 in FIG. 1 to FIG. 5 are in a single shaft configuration. Similar embodiments may be implemented in a multi-shaft configuration, where a main steam turbine 300 and a gas turbine 200 may be connected to separate generators.

Figure 6:
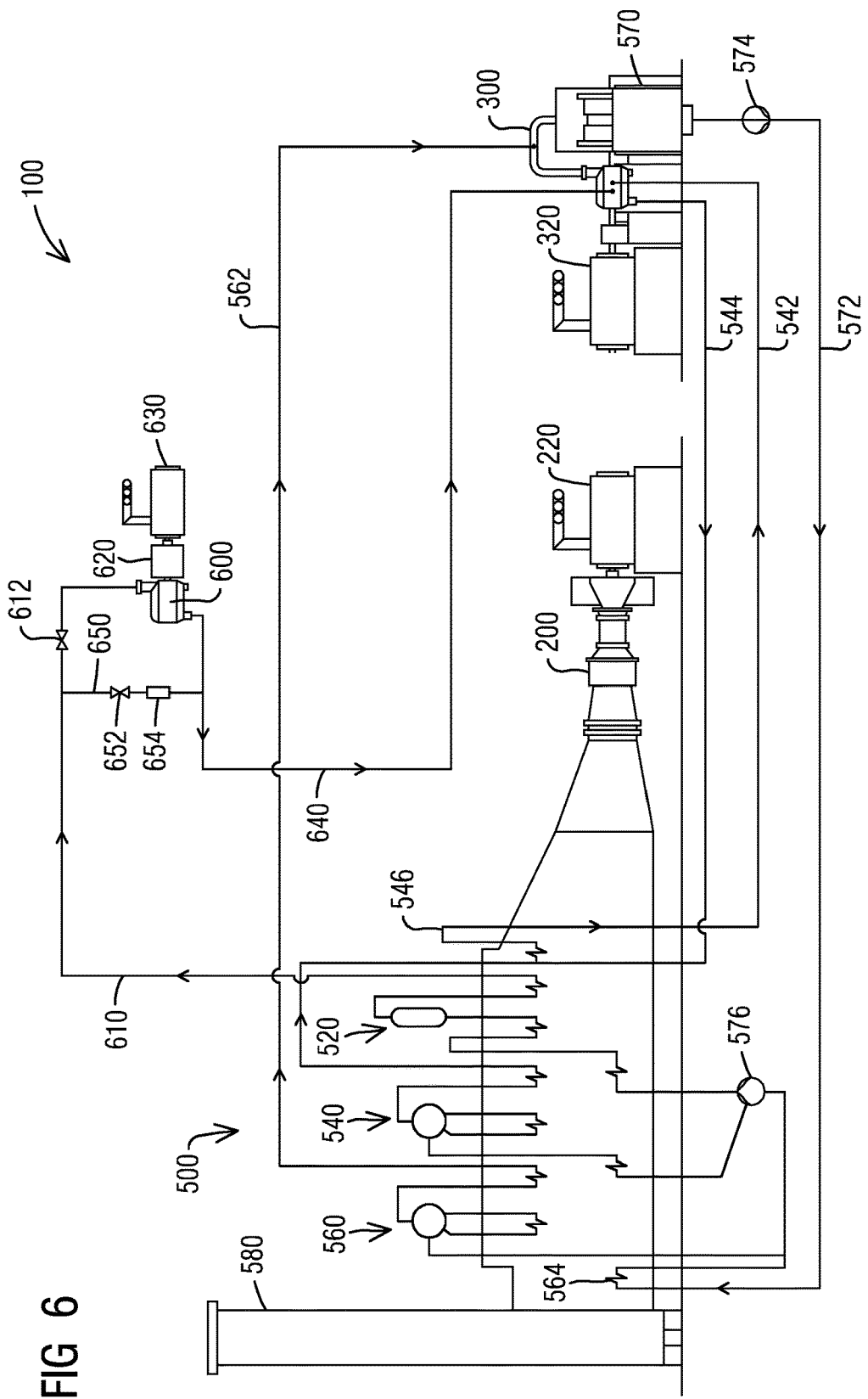
FIG. 6 illustrates a schematic flow diagram of a multi-shaft combined cycle power plant having a supercritical steam turbine according to an embodiment wherein a supercritical steam turbine is connected to a supercritical steam turbine generator.

FIG. 6 illustrates a schematic flow diagram of a multi-shaft CCPP 100 having a SST 600 according to an embodiment. In this embodiment, a gas turbine 200 may be connected to a gas turbine generator 220. A main steam turbine 300 may be connected to a main steam turbine generator 320. According to an embodiment, a SST 600 may be operated at a rotational speed that is higher than a grid frequency. In the illustrated example embodiment of FIG. 6, the SST 600 may be connected to a gearbox 620. The gearbox 620 may reduce a rotational speed of the SST 600 that is higher than a grid frequency to the grid frequency. According to the example embodiment illustrated in FIG. 6, the combined cycle power plant may include a supercritical steam turbine generator 630. The SST 600 may be connected to the supercritical steam turbine generator 630 via the gearbox 620 to generate power output after reducing the rotational speed to the grid frequency. According to an embodiment, the supercritical steam turbine generator 630 may be arranged at a location for easy installation. According to an embodiment, the SST 600 may be arranged at a location that is close to a HRSG 500 to reduce high energy piping length. The embodiment of FIG. 6 otherwise corresponds to the embodiment of FIG. 1. Corresponding parts of FIG. 6 are correspondingly numbered, but are not described again with reference to FIG. 6.

Figure 7:
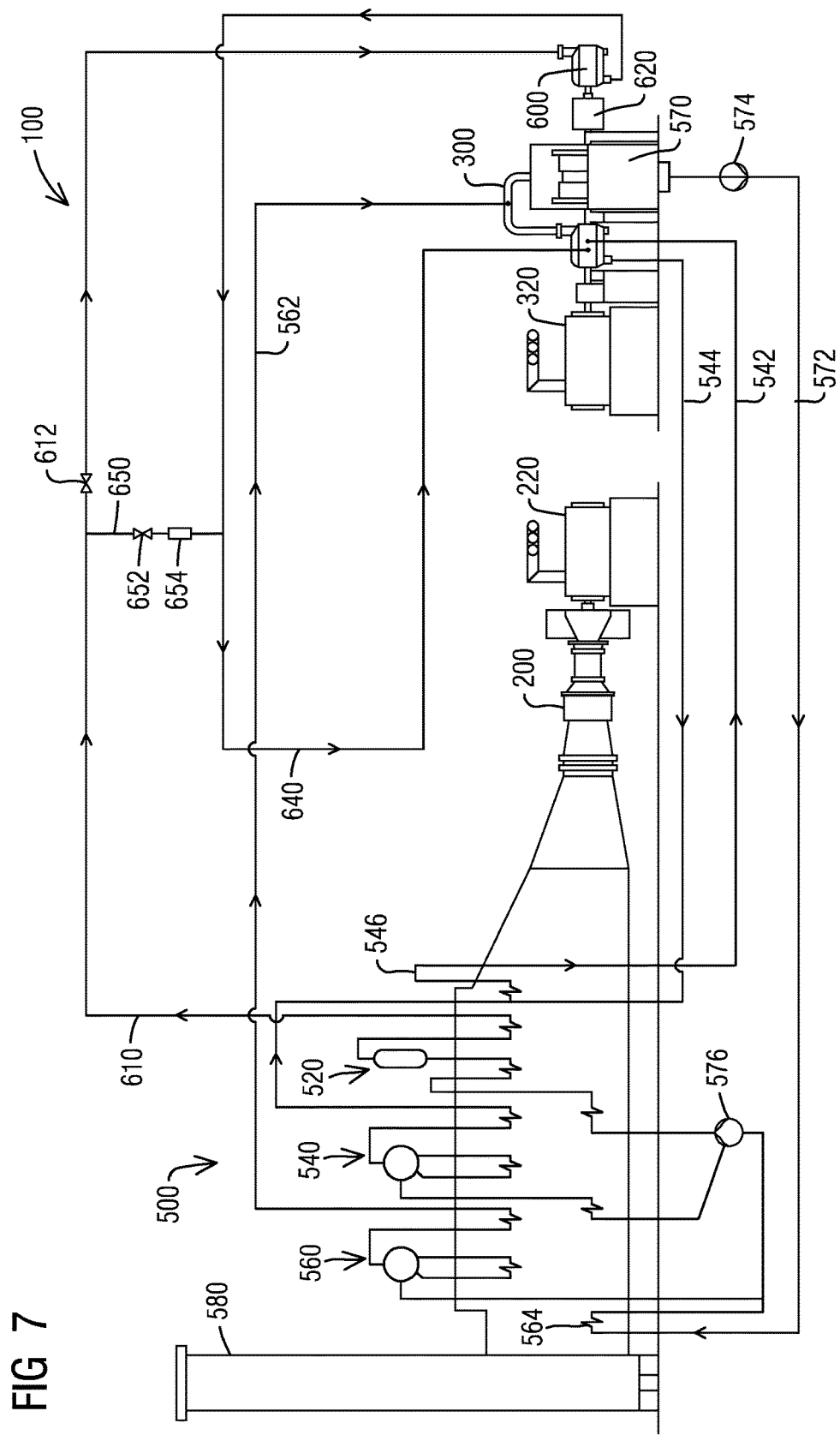
FIG. 7 illustrates a schematic flow diagram of a multi-shaft combined cycle power plant having a supercritical steam turbine according to an embodiment wherein a supercritical steam turbine is connected to a main steam turbine.

FIG. 7 illustrates a schematic flow diagram of a multi-shaft CCPP 100 having a SST 600 according to an embodiment. In this embodiment, a gas turbine 200 may be connected to a gas turbine generator 220. A main steam turbine 300 may be connected to a main steam turbine generator 320. According to an embodiment, a SST 600 may be operated at a rotational speed that is higher than a grid frequency. In the illustrated example embodiment of FIG. 7, the SST 600 may be connected to a gearbox 620. The gearbox 620 may reduce the rotational speed of the SST 600 that is higher than a grid frequency to the grid frequency. According to the example embodiment illustrated in FIG. 7, the SST 600 may be connected to a main steam turbine 300 via the gearbox 620 after reducing the rotational speed to the grid frequency. According to the example embodiment as illustrated in FIG. 7, the SST 600 may not require a separate generator. The embodiment of FIG. 7 otherwise corresponds to the embodiment of FIG. 2. Corresponding parts of FIG. 7 are correspondingly numbered, but are not described again with reference to FIG. 7.

According to an aspect, the disclosed embodiments may include a separate SST 600 and a main steam turbine 300. The separate SST 600 may be operated at a rotational speed that is much higher than a grid frequency. The rotational speed of the SST 600 may be reduced to a grid frequency by a gearbox 620.

According to an aspect, the disclosed embodiments may address limitation of a power plant efficiency improvement of a single steam turboset. In a single steam turboset, a supercritical section, a high pressure section, an intermediate pressure, and a low pressure section may be all operated at the same speed at a grid frequency. This may impact plant efficiency improvement due to effects of the supercritical steam. For example, high pressure of the supercritical steam may increase shaft seal leakage losses. High pressure of the supercritical steam may reduce flow volume resulting in low turbine efficiency. The disclosed embodiments comprise a separate supercritical steam turbine and a main turbine. The disclosed embodiments may allow optimizing steam parameters to individual needs of each steam turbine section.

Figure 8:
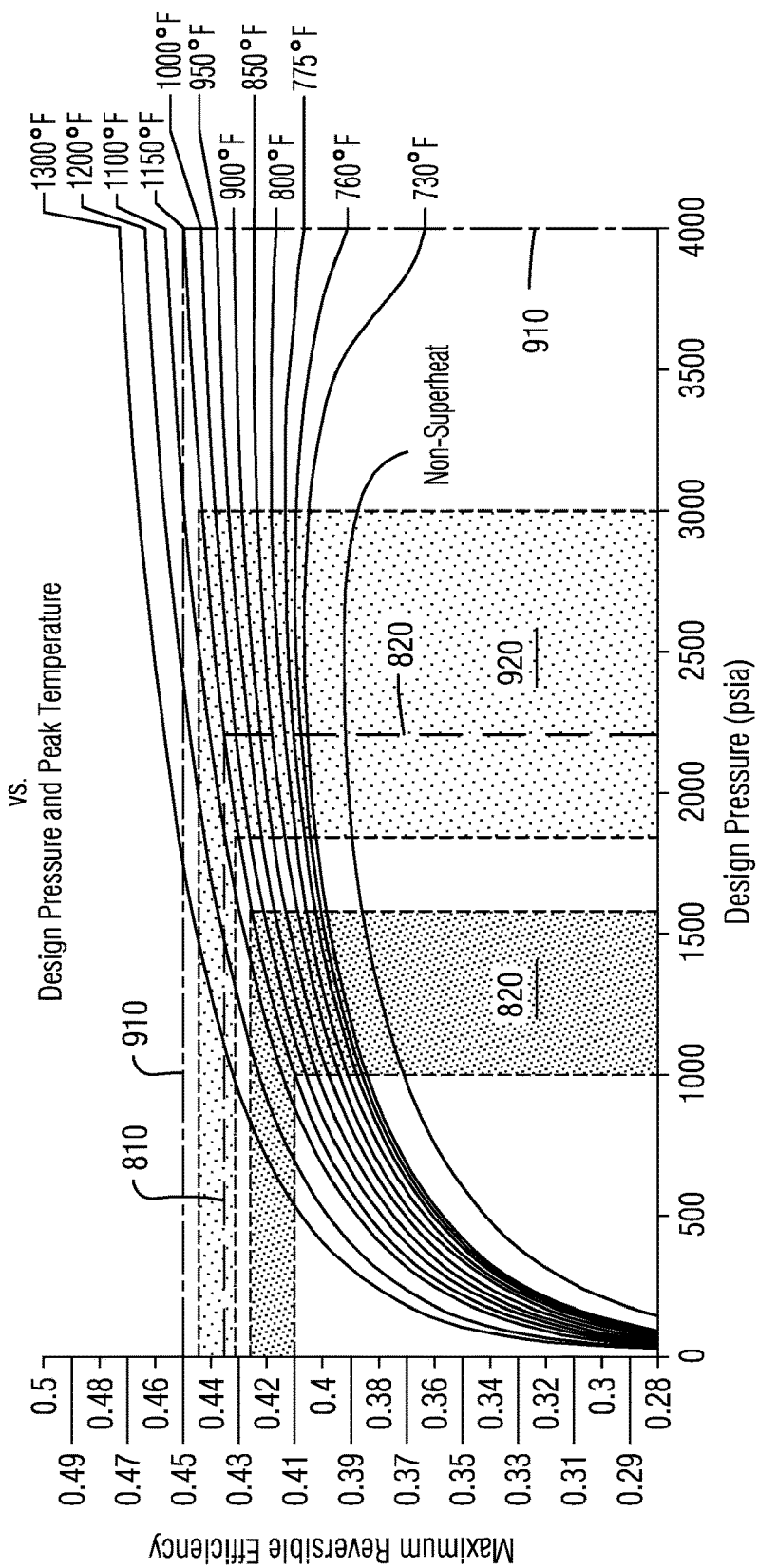
FIG. 8 illustrates a graphical representation of a Maximum Reversible Efficiency of Non-Regerative Rankine Steam Cycle versus Design Pressure and Peak Temperature, of which shows a reduction in part load efficiency impact resulting from an embodiment of a method for operating a combined cycle power plant with supercritical steamturbine, in accordance with the disclosure provided herein.

With continued reference to the figures, and now FIG. 8 a graphic representation of two operation designs for the CCPP 100 operated at a base load and a part load are provided. The two operation designs of FIG. 8 illustrate a subcritical operation design pressure and a supercritical operation design pressure, where the SST 600 may be operated at supercritical pressures. Depending on whether the CCPP 100 is, e.g., a 3×1 combined cycle power plant design, a 2×1 combined cycle power plant design, the part load operation may be between 50 to 70 percent of the CCPP 100 base load operation. However, it should be appreciated that the methods for improving efficiency described herein is applicable to percentages lower or higher than the 50 to 70 percent described for exemplary purposes.

The first operation design shows a subcritical base load operation 810 operating, e.g., at approximately 2200 pounds per square inch absolute (psia) and 1050° Fahrenheit, and having a part load operation 820 within the range of 1000 to 1600 psia. This subcritical operation demonstrates a lower steam cycle efficiency, as a maximum reversible efficiency of the based load operation 810 drops from about 0.435 to about 0.41 (at 1000 psia), which is the lowest maximum reversible efficiency of the part load operation 820, which includes a range between 0.41-0.425.

The second CCPP operation design illustrates a base load operation 910 in accordance with an embodiment of the present invention, which operates at a supercritical pressure of approximately 4000 psia and 1050° Fahrenheit, and has a maximum reversible efficiency of 0.45. A part load operation 920 for the supercritical base load operation 910 may be within the range of 1800 psia to 3000 psia. As shown in FIG. 8, in contrast to the subcritical base load operation 810, the maximum reversible efficiency for the supercritical base load operation 910 may be approximately 0.45, which drops in the part load operation 920 to about 0.43 maximum reversible efficiency (at 1800 psia), which is the lowest maximum reversible efficiency of the part load operation 920, which includes a range between about 0.43-0.445.

The supercritical base load operation demonstrates higher steam plant efficiency, as compared to the subcritical operation, as the second CCPP operation of FIG. 8, shows, e.g., a delta of about 0.005 with the base load operation 910 at about 4000 psia and the part load 920 at about 3000 psia. In this exemplary embodiment, the maximum reversible efficiency of the part load operation 920 is closer to the maximum reversible efficiency of the base load operation 910, hereby improving plant efficiency both at part load and base load, as any penalty resulting from a part load operation decreases with the implementation of the higher pressure (supercritical) base load operation design.

Figure 9:
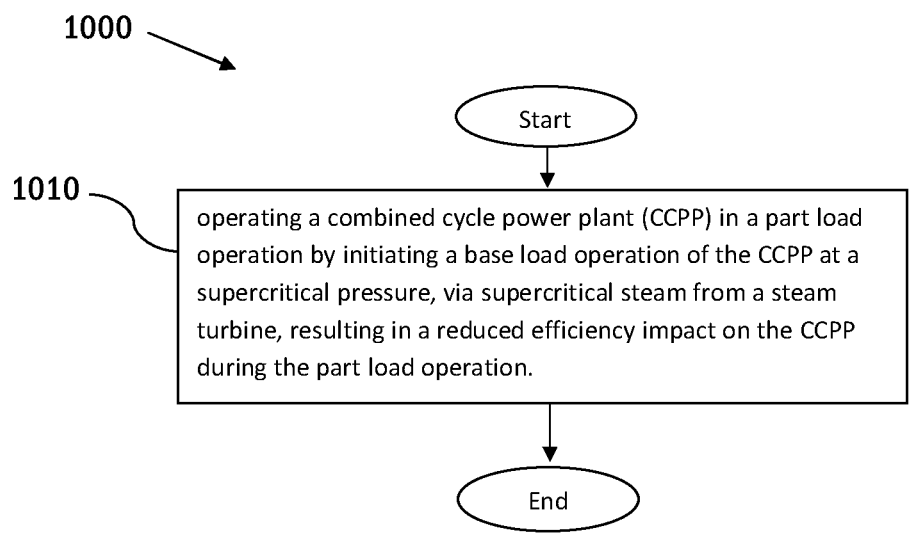
FIG. 9 illustrates a schematic flowchart of a method for reducing a part load operation penalty in a combined cycle power plant with supercritical steamturbine, in accordance with the disclosure provided herein.

With continued reference to the figures and now FIG. 9, an embodiment of a method 1000 for reducing the efficiency impact on a part load operation in a CCPP with the SST 600 is provided. In an exemplary embodiment, the method 1000 includes the step of: initiating a base load pressure at a supercritical steam level to reduce the efficiency impact of a part load operation (1010). The supercritical steam level may include a supercritical pressure level of about 4000 psia. The supercritical steam level may further comprise a supercritical temperature of about 1050° Fahrenheit. However, it should be appreciate, as previously disclosed herein, that the supercritical pressure and temperature levels may be a pressure and temperature above critical, i.e., a pressure above 3206.2 psia and a temperature above 705.4° Fahrenheit.

In this step, and as previously described herein, the base load operation is initiated at a supercritical pressure level, i.e., at a level above a critical pressure level, e.g., the base load operation 910 at 4000 psia in FIG. 8. As illustrated in FIG. 8, the base load operation 910 at 4000 psia may have a part load operation between 1800 psia and 3000 psia. As shown in FIG. 8, the supercritical base load pressure results in a higher steam cycle efficiency, as the maximum reversible efficiency of part load operation 920 is closer or proximate to the maximum reversible efficiency of base load operation 910, e.g., when the part load operation is at about 3000 psia and the base load operation is at about 4000 psia, as the part load penalty decreases with the supercritical pressure base load operation. The improved part load operation efficiency is further illustrated by the curved lines of FIG. 8, as the curved lines gradually flatten as the pressure increases to supercritical, demonstrating a lesser penalty in the part load operation during a supercritical cycle.

Figure 10:
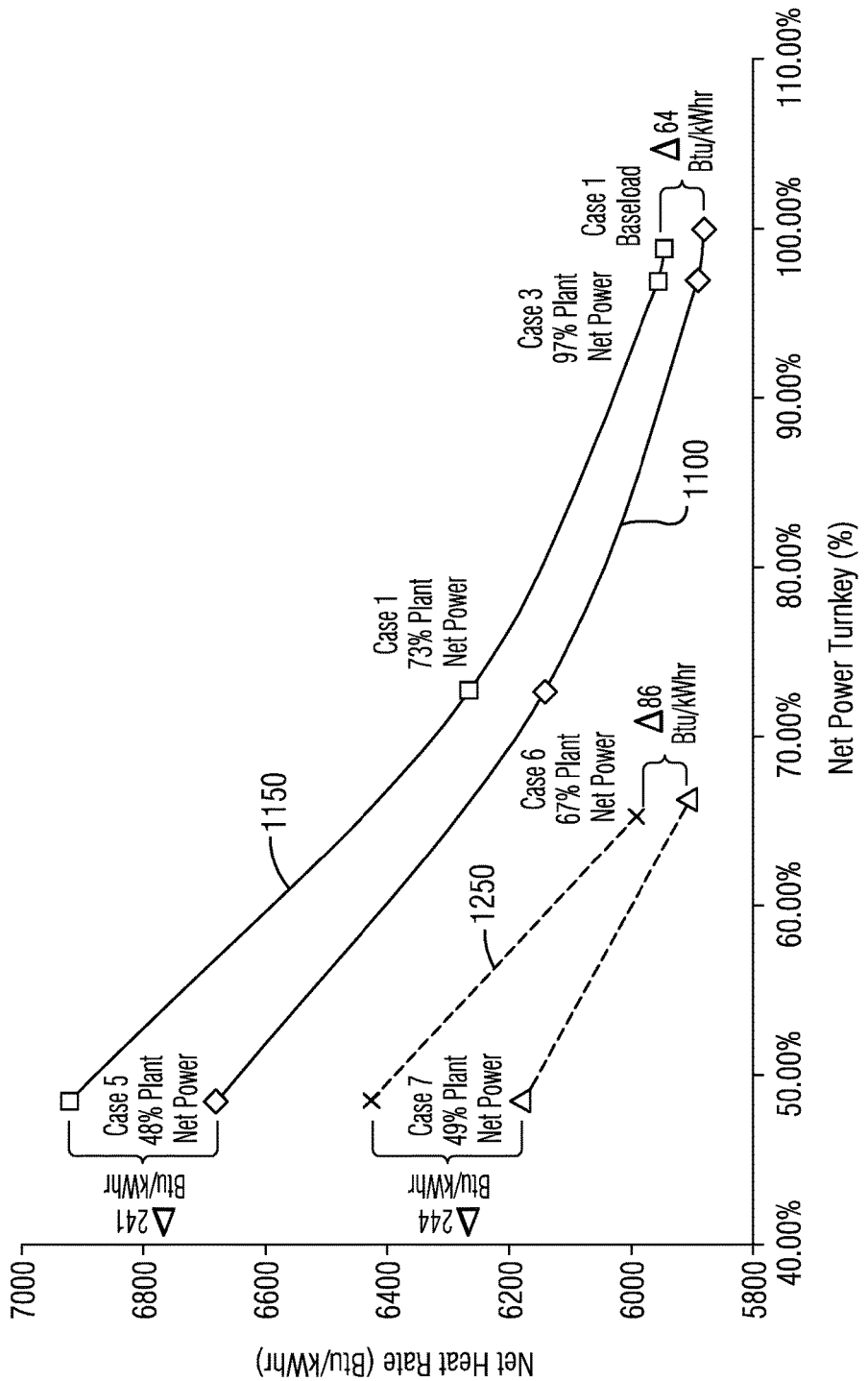
FIG. 10 illustrates a graphical representation of a heat rate improvement in both a 2×1 and 3×1 combined cycle power plant resulting from an embodiment of the supercritical operations, in accordance with the disclosure provided herein.

The higher efficiency resulting from the supercritical operation is further illustrated in the graphical representation of FIG. 10, which illustrates an improvement in the heat rate improvement resulting in a 2×1 and 3×1 combined cycle power plant operation using the supercritical base load operation described herein, as compared to the subcritical operation. As shown in FIG. 10, the net heat rate in the supercritical operation 1100 in the 3×1 CCPP is improved as compared to the subcritical operation 1150. Similarly, the net heat rate in the supercritical operation 1200 in the 2×1 CCPP is improved as compared to the subcritical operation 1250.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

We claim:

1. A method for improving part load efficiency in a combined cycle power plant (CCPP) comprised of a gas turbine, a heat recovery steam generator located downstream of the gas turbine, and at least one steam turbine, comprising the step of:
   initiating a base load operation of the CCPP at a supercritical pressure, via supercritical steam from the steam turbine, followed by operating the CCPP in a part load operation at a subcritical pressure resulting in a reduced efficiency impact on the CCPP during the part load operation.

2. The method of claim 1, wherein the supercritical pressure is about 4000 psia resulting in the part load operating between 1800 and 3000 psia.

3. The method of claim 1, wherein the part load operation has a maximum reversible efficiency of about 0.43 when the part load operation is about 1800 psia.

4. The method of claim 1, wherein the part load operation has a maximum reversible efficiency of about 0.445 when the part load is operated at about 3000 psia.

5. The method of claim 1, wherein the CCPP comprises a second steam turbine, and wherein a second base load operation of the CCPP is operated at a subcritical pressure, via the second steam turbine.

6. The method of claim 5, wherein the subcritical pressure is about 2200 psia, and wherein a second part load operation corresponding to the second base load operation is operated between 1000 to 1600 psia.

7. The method of claim 6, wherein deltas of the supercritical base load operation and corresponding part load operation are less than deltas of the subcritical second base load operation and corresponding second part load operation, and the deltas of the supercritical base load operation are indicative of an improvement in part load efficiency.

8. A method for operating a combined cycle power plant (CCPP) having a gas turbine, a heat recovery steam generator having a low pressure steam system, an intermediate pressure steam system, and a high pressure steam system and located downstream of the gas turbine, a main steam turbine, and a supercritical steam turbine, the method comprising the steps of:
   generating power output from the gas turbine generator;
   generating low pressure steam, via the low pressure steam system, by extracting energy from exhaust gas of the gas turbine;
   generating intermediate pressure steam, via the intermediate pressure steam system, by extracting energy from the exhaust gas;
   generating supercritical steam, via the high pressure steam system, by extracting energy from the exhaust gas;
   transferring the supercritical steam to the supercritical steam turbine;
   expanding the supercritical steam in the supercritical steam turbine to generate power output and producing exiting steam;
   receiving the generating supercritical steam by a high pressure steam turbine section in the main steam turbine;
   operating the main steam turbine to generate power output from the exiting steam in the high pressure section of the main steam turbine, the intermediate pressure steam, and the low pressure steam; and
   operating the CCPP in part load by initiating a base load operation of the CCPP with the supercritical steam, via the supercritical steam turbine, resulting in a reduced part load efficiency impact on the CCPP.

9. The method of claim 8, wherein the supercritical steam at the base load operation is about 4000 psia, and the part load operates between 1800 to 3000 psia.

10. The method as claimed in claim 8, further comprising operating the supercritical steam turbine at a rotational speed that is higher than a grid frequency while the main steam turbine operates at the grid frequency.

11. The method as claimed in claim 8, further comprising:
   generating a subcritical high pressure steam in the high pressure steam system,
   mixing the subcritical high pressure steam with the exiting steam to generate a high pressure steam mixture, and
   transferring the high pressure steam mixture to the main steam turbine.

12. The method as claimed in claim 8, further comprising:
   generating a subcritical high pressure steam in the high pressure steam system,
   mixing the subcritical high pressure steam with the exiting steam to generate a high pressure steam mixture,
   reheating the high pressure steam mixture in the heat recovery steam generator, transferring the reheated high pressure steam mixture to the main steam turbine.

* * * * *